Jan. 28, 1958 F. W. HICKS, JR 2,821,355
SOLENOID VALVES
Filed March 24, 1955 3 Sheets-Sheet 1
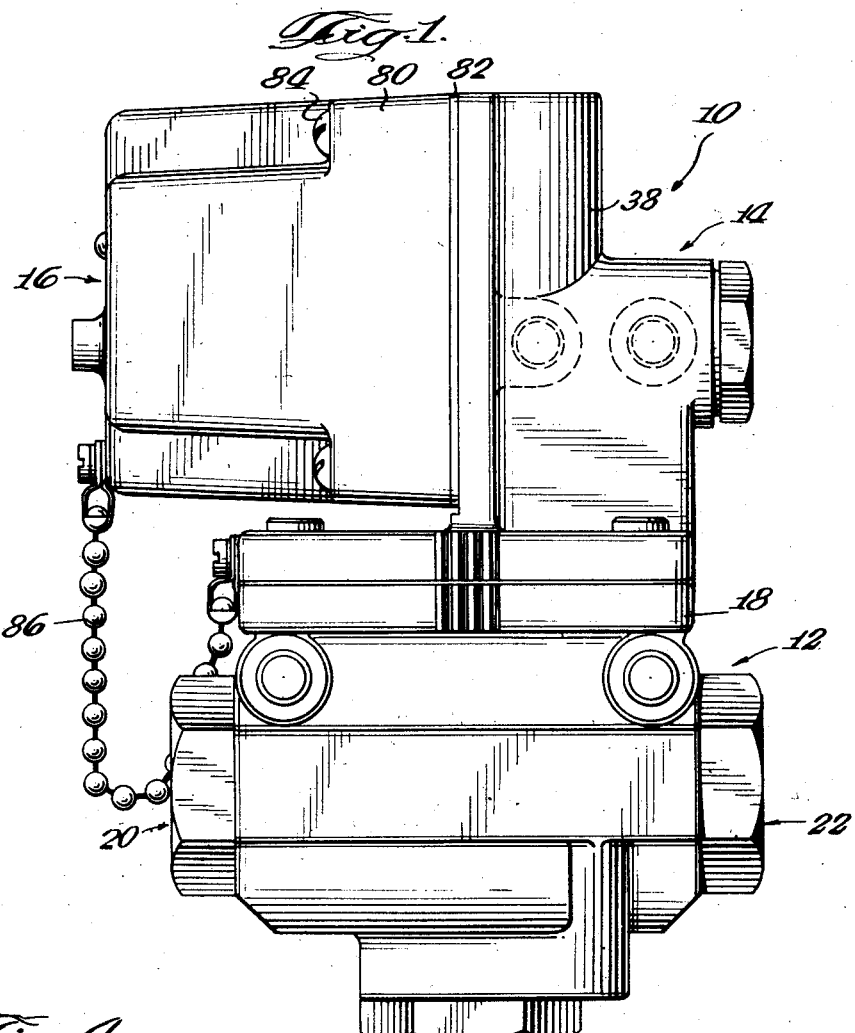
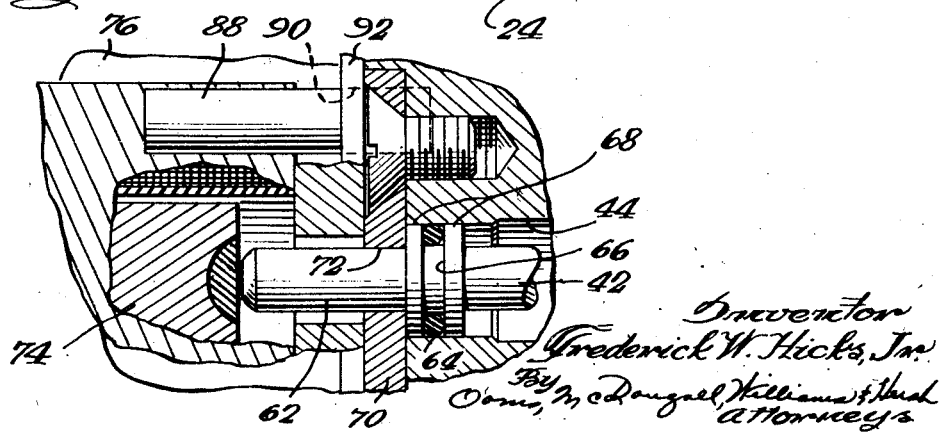

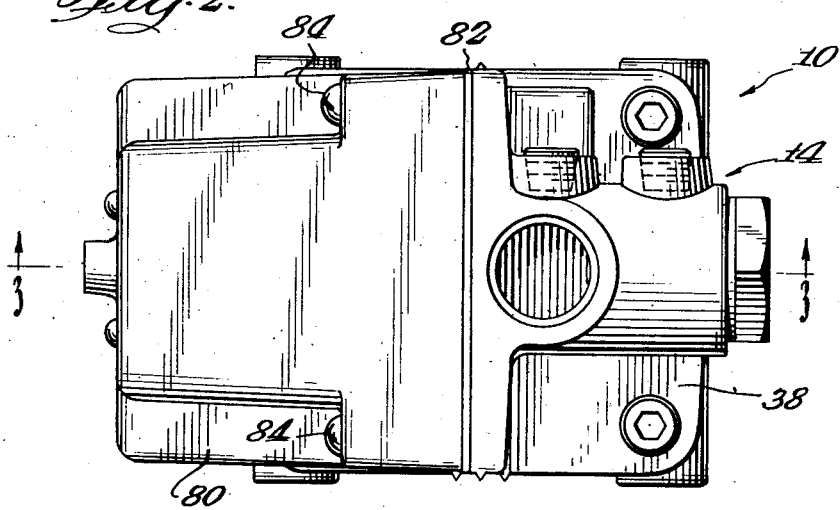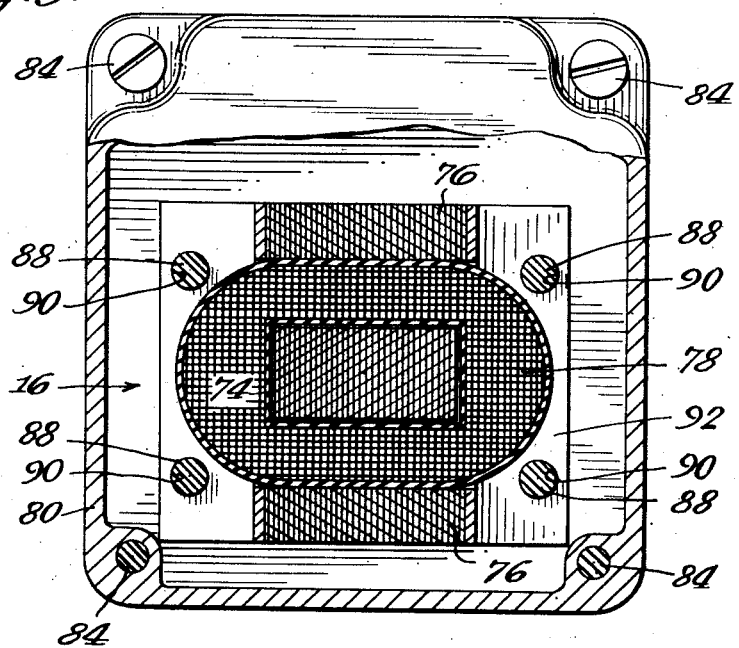

Jan. 28, 1958 F. W. HICKS, JR 2,821,355
SOLENOID VALVES

Filed March 24, 1955 3 Sheets-Sheet 3

Inventor
Frederick W. Hicks, Jr.
By Ooms, McDougall, Williams & Hersh
Attorneys

United States Patent Office 2,821,355
Patented Jan. 28, 1958

2,821,355

SOLENOID VALVES

Frederick W. Hicks, Jr., Skokie, Ill., assignor to Hannifin Corporation, Des Plaines, Ill., a corporation of Illinois Application March 24, 1955, Serial No. 496,457

3 Claims. (Cl. 251—129)

This invention relates to new and improved power-actuated valves and particularly to solenoid valves.

One principal object of the invention is to provide a new and improved power-actuated valve which is equipped with a movable housing and is arranged so that the valve will automatically be rendered inoperative when the housing is removed.

It is a further object to provide a new and improved solenoid operated valve which is equipped with a removable solenoid housing and is arranged so that the solenoid will be incapable of operating the valve when the housing is removed.

Another object is to provide a new and improved valve having an automatic disabling arrangement which is entirely effective and dependable, yet is simple and low in cost.

Further objects and advantages of the invention will appear from the following description, taken with the accompanying drawings, in which:

Figure 1 is an elevational view of an exemplary valve constituting an illustrative embodiment of the invention.

Fig. 2 is a top view of the valve.

Fig. 4 is a fragmentary enlargement of a portion of Fig. 3.

Fig. 5 is an elevational view, partly in section along a line 5—5 in Fig. 3.

Figures 3, 6:
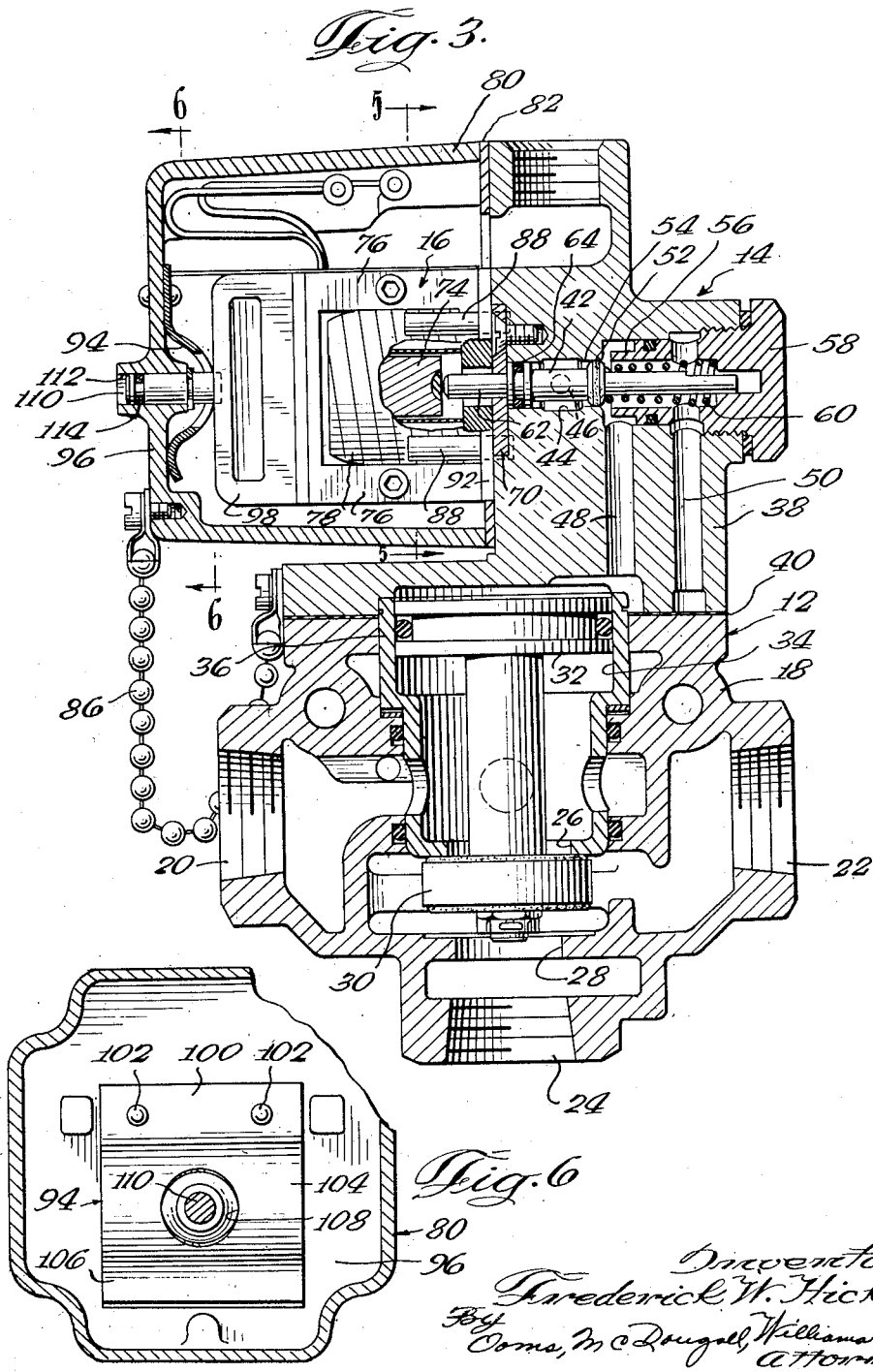
Fig. 3 is an elevational sectional view, taken generally along a line 3—3 in Fig. 2.
Fig. 6 is a sectional view taken generally along a line 6—6 in Fig. 3.

If the drawings are considered in greater detail, it will be seen that they illustrate an exemplary solenoid valve 10, which actually comprises a main valve mechanism 12 operable by a pilot valve 14. The pilot valve 14 is controlled by a solenoid 16 (Fig. 3).

While in many respects the construction of the valve mechanisms 12 and 14 forms no part of the present invention, it will be of general interest to note that the main valve mechanism 12 includes a valve body 18 formed with an inlet opening 20, an outlet opening 22, and an exhaust opening 24. Ports 26 and 28 are adapted to afford communication between the outlet opening 22 and the inlet and exhaust openings 20 and 24, respectively. Such communication is controlled, however, by a poppet valve 30 adapted to close the ports 26 and 28 alternately. The poppet valve 30 is operable by a piston 32 movable in a bore 34, which is formed in a bushing or valve sleeve 36 received in the main valve body 18.

It will be noted that the pilot valve 14 includes a valve body 38 which is removably secured against the upper end of the main valve body 18, a gasket 40 being interposed between the two valve bodies. A valve plunger 42 is movable in a horizontal bore 44 formed in the pilot valve body 38. Ports or passages 46, 48 and 50 communicate with the valve bore 44 at points spaced therealong. It will be seen that the passage 48 extends to the upper end of the piston bore 34, above the piston 32. The passages 46 and 50 may serve interchangeably as pressure and exhaust passages, according to the desired mode of operation of the valve.

To control fluid flow along the valve bore 44, the plunger 42 is provided with a valve control member in the form of a disk-like land or enlargement 52. Normally, the valve land 52 closes off a port 54 formed by a portion of the bore 44 of reduced diameter. It will be seen that the port 54 is adapted to afford communication between the passages 46 and 48. Aligned with the port 54 is a second port 56 formed in a plug 58 which closes one end of the bore 44. The port 56 is adapted to afford communication between the passages 48 and 50. The plunger 42 is movable so as to shift the valve land 52 from the port 54 to the port 56. In order to bias the valve plunger toward its normal position, a coil spring 60 is interposed between the plug 58 and the valve land 52.

It will be seen that the plunger 42 has a lefthand end portion 62 which projects out of the pilot valve body 38 through the lefthand end of the bore 44. The end of the bore 44 is sealed by a sealing ring 64 seated in an annular groove 66 which is formed between a pair of spaced flanges 68 on the plunger 42. A plate 70 serves as a stop to limit outward movement of the plunger 42. The end portion 62 of the plunger 42 extends through an aperture 72 in the stop plate 70, and the lefthand flange 68 is engageable with the righthand side of the stop plate.

The solenoid 16 functions as a power-operated device to actuate the pilot valve 14. Thus the solenoid 16 comprises a movable armature 74 engageable with the projecting end portion 62 of the valve plunger 42. The armature is movable relative to a generally U-shaped magnetic core 76 adapted to be magnetized by a coil or winding 78. Thus, energization of the coil 78 will result in movement of the armature 74 in a righthand direction, relative to the core 76. With the valve 10 in operative condition, such movement of the armature 74 is effective to shift the valve plunger 42 to the right, against the biasing action of the valve spring 60.

In order to enclose the solenoid 16, the valve 10 is equipped with a hollow cover housing 80 adapted to be disengageably mounted on the pilot valve body 38. It will be seen that a gasket 82 is interposed between the cover 80 and the pilot valve body 38. The cover 80 is disengageably secured to the valve body 38 by any suitable means, such as the illustrated clamping screws 84, which are effective to clamp the gasket 82 between the cover and the valve body. A chain 86, or the like, extends between the cover 80 and the valve body 38 to prevent loss of the cover when it is removed from the valve body.

In order that the solenoid 16 may automatically be rendered ineffective to operate the valve plunger 42 when the cover 80 is removed, the solenoid 16 is not rigidly mounted on the valve body 38. Instead, the solenoid 16 is mounted so as to be movable away from its operative position adjacent the valve body 38, to an inoperative position spaced away from the valve body. Such movement of the solenoid 16 is in a horizontal direction parallel to the direction of movement of the valve plunger 42. The solenoid 16 is supported for such movement by means of a plurality of guide pins 88 (Figs. 3 and 5) mounted on the pilot valve body 38 and extending to the left from the body in parallel relation to the plunger 42. It will be seen that the guide pins 88 extend through aperture 90 formed in a mounting plate 92 which is secured to the right hand end of the solenoid core 76. The pins 88 are slideably received within the aperture 90, with the result that the plate 92 is slideable outwardly along the pins, away from the pilot valve body 38.

The cover 80 is arranged so that it will normally clamp the solenoid 16 in its operative position against the pilot valve body 38. Such clamping is effected by means of a spring 94 adapted to act between the cover 80 and the solenoid 16. In this instance, the cover 80 has an end wall 96 which supports the spring 94. A frame or housing 98 is mounted on the left hand end of the solenoid core 76 for engagement with the spring 94. It will be seen that the illustrated spring 94 is in the form of a thin leaf or strip having a flat end portion 100 secured to the end wall 96 by any suitable means, such as the illustrated rivets 102. The spring 94 has an outwardly bowed or arching mid-section 104 adapted to engage the solenoid. At its opposite or lower end, relative to the upper end portion 100, the spring 94 has a curved foot portion 106 which slideably engages the housing end wall 96. An aperture 108 is formed in the spring 94 to afford clearance for a plunger 110 extending into the solenoid housing 98. It will be seen that the plunger 110 also extends along an aligned aperture 112 formed in the cover 80. The plunger 110 may be pushed inwardly, by means of a rod inserted through the aperture 112, so as to engage the solenoid armature 74 and thereby operate the valve plunger 42 manually. A sealing ring 114 is provided between the plunger 110 and the aperture or bore 112.

It will be understood that the clamping spring 94 is made substantially stronger than the valve biasing spring 60 so that the clamping spring will hold the solenoid 16 in its operative position against the valve body 38, whenever the cover 80 is in place on the valve body. When the solenoid 16 is energized, the armature 74 will be moved to the right so as to move the valve plunger 42 against the biasing action of the spring 60. Of course, there is an outward reactive force which tends to push the solenoid core 76 away from the valve body 38 whenever the solenoid is energized. However, the spring 94 resists this reactive force and retains the solenoid 16 in its operative position adjacent the valve body 38.

When the cover 80 is removed from the valve body 38, the solenoid 16 is no longer clamped against the valve body. Because of the slideable relation between the mounting plate 92 and the guide pins 88, the solenoid core 76 is easily movable away from the valve body 38. Thus, if the solenoid coil 78 is energized, the core 76 will move outwardly away from the valve body 38, with the mounting plate 92 sliding along the pins 88. The force of the spring 60 will prevent the armature 74 from moving the plunger 42 inwardly. Thus the core 76 will move rather than the armature 74. Accordingly, the solenoid 16 will be ineffective to operate the valve plunger 42. Of course, the valve plunger 42 can still be operated manually by using a rod to move the armature 74.

By virtue of the provision of the leaf spring 94, the clamping screws 84 are effective to clamp both the cover 80 and the solenoid 16 against the valve body 38. The gasket 82 is effectively clamped between the cover 80 and the valve body 38. The spring 94 yields to allow for any minor dimensional variations in the cover 80 or the solenoid 16. Thus the spring 94 eliminates any problems with manufacturing tolerances. The spring 94 is always compressed to a substantial extent when the cover 80 is mounted on the valve body 38. The exact amount to which the spring 94 is compressed depends upon minor dimensional variations in the solenoid 16 and the cover 80. The spring 94 is capable of accommodating a considerable range of such dimensional variations.

It will be evident that the present invention provides a mechanism whereby the solenoid is automatically rendered ineffective when the solenoid cover is removed. The mechanism is entirely effective and dependable in operation yet is simple, easy to manufacture and low in cost.

Various modifications, alternative constructions, and equivalents may be employed without departing from the true spirit and scope of the invention as exemplified in the foregoing description and defined in the following claims.

I claim:
1. In a valve for controlling fluid flow, the combination comprising a valve body having a plurality of ports therein, a valve plunger movable horizontally in said body for selectively controlling communication between said ports, a valve spring in said valve body biasing said plunger in one direction, a solenoid having a horizontally movable armature engaging said plunger for moving said plunger in the opposite direction, said solenoid having a mounting plate with a plurality of apertures therein, horizontal guide pins on said body and received in said apertures and supporting said solenoid for sliding movement toward and away from said body and in the direction of movement of said plunger, a hollow cover engageable with said valve body for enclosing said solenoid, a gasket interposed between said cover and said valve body, means for securing said cover to said valve body with said gasket clamped therebetween, and a leaf spring mounted in said cover and acting against said solenoid for clamping said solenoid against said valve body to hold said solenoid in operative position, said leaf spring being substantially stronger than said valve spring to maintain said solenoid in operative position against the reaction of said valve spring when said solenoid is energized, any energization of said solenoid with said cover removed being ineffective to overcome said valve spring and move said armature and said plunger but rather being effective to slide said solenoid away from said valve body.

2. In a valve for controlling fluid flow, the combination comprising a valve body having a plurality of ports therein, a valve member movable in said body for selectively controlling communication through said ports, a valve spring in said body biasing said member in one direction to a home position, a solenoid having a movable armature engaging said member and operative to move said member in the opposite direction away from said home position, said solenoid having a mounting plate with a plurality of apertures therein, guide pins on said body and received in said apertures and supporting said solenoid for sliding movement toward and away from said body and in the direction of movement of said member, a hollow cover engageable with said valve body for enclosing said solenoid, means removably securing said cover to said valve body around said solenoid, and a retaining spring mounted between said cover and said solenoid for clamping said solenoid in an operative position against said valve body, said retaining spring being substantially stronger than said valve spring to maintain said solenoid in said operative position against the reaction of said valve spring when said solenoid is energized, any energization of said solenoid with said cover removed being ineffective to overcome said valve spring and move said armature and said valve member but rather being effective to slide said solenoid away from said valve body to an inoperative position.

3. In a valve for controlling fluid flow, the combination comprising a valve body having a plurality of ports therein, a valve member movable in said body for selectively controlling communication through said ports, a valve spring in said valve body biasing said member in one direction to a home position, a power-actuated device having a movable actuating element engageable with said member for moving said member in the opposite direction away from said home position, guide means supporting said power-actuated device for movement toward and away from said body and in the direction of movement of said member, a hollow cover engageable with said body for enclosing said power-actuated device, means removably securing said cover to said body and around said power-actuated device, and a retaining spring mounted between said cover and said power-actuated device for retaining said power-actuated device in an operative position against said valve body, said retaining spring being substantially stronger than said valve spring to maintain said device in said operative position against the reaction of said valve spring when said device is energized, any energization of said power-actuated device with said cover removed being ineffective to overcome said valve spring and move said actuating element and said member but rather being effective to move said device away from said valve body to an inoperative position.

References Cited in the file of this patent
UNITED STATES PATENTS

| | | |
|---|---|---|
| 2,117,726 | Johnson | May 17, 1938 |
| 2,610,680 | Witzel | Sept. 16, 1952 |